Jan. 6, 1970  A. RICKENMANN  3,487,585
HOBBING TYPE GEAR GRINDER
Filed Feb. 1, 1966  9 Sheets-Sheet 5
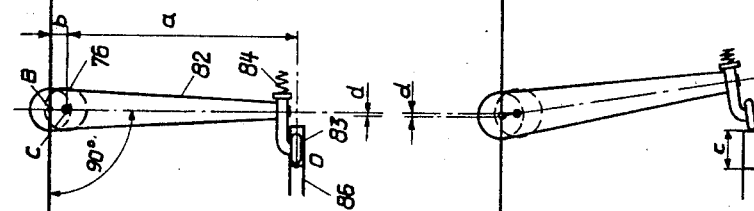
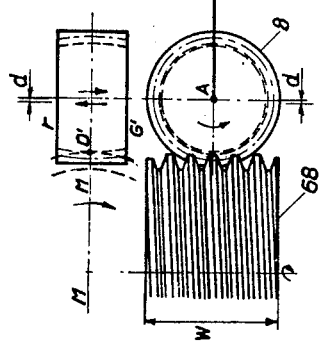
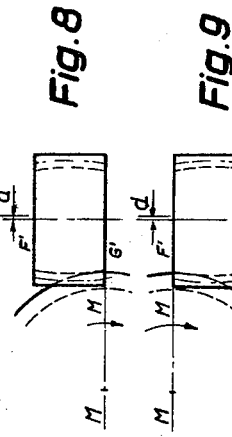

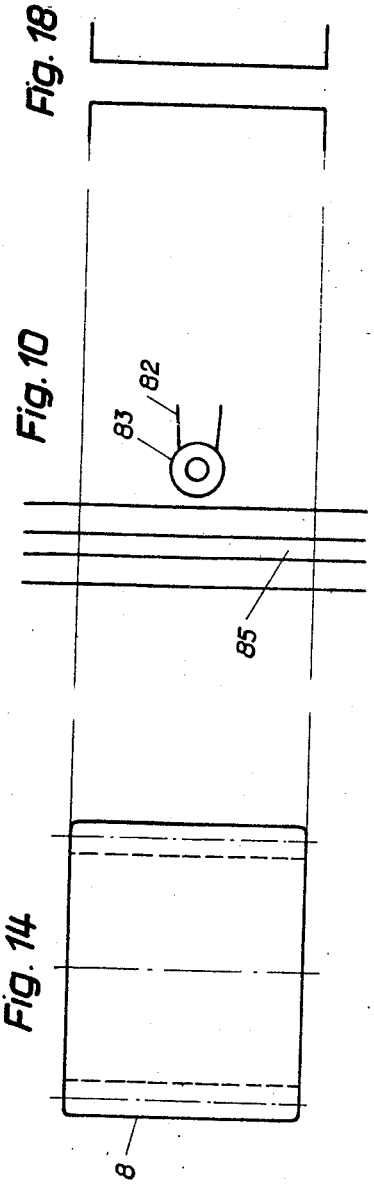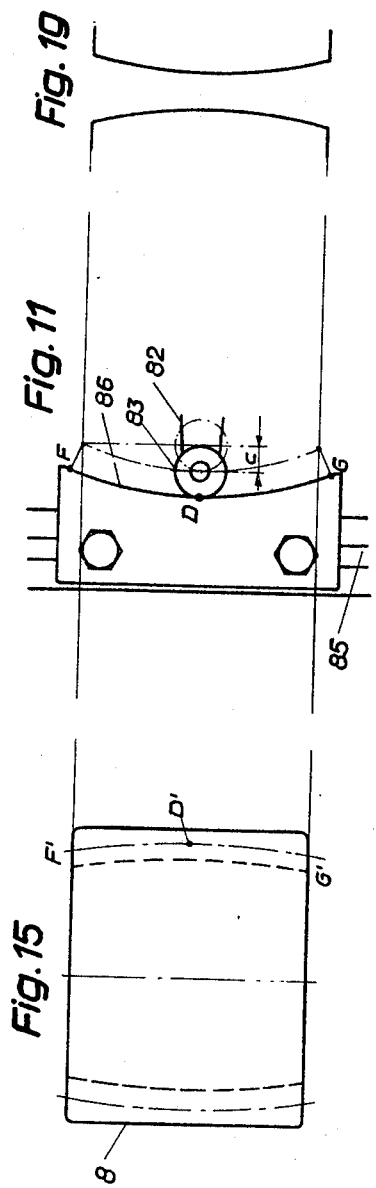

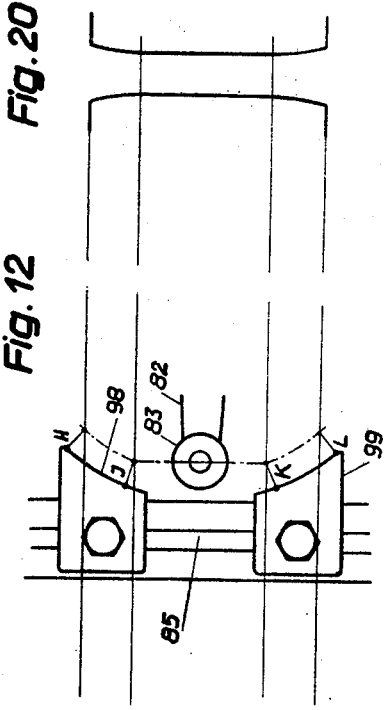
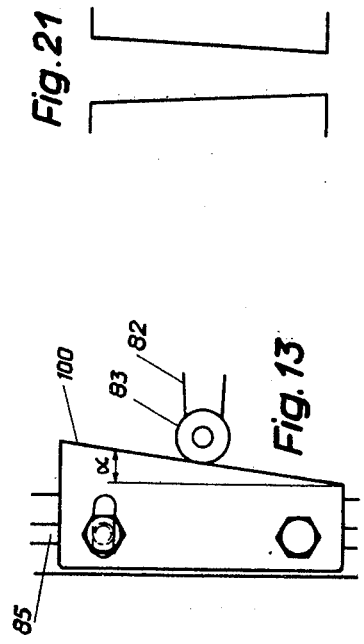
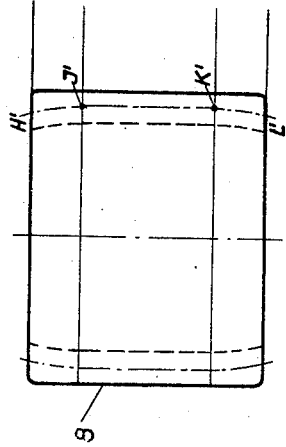
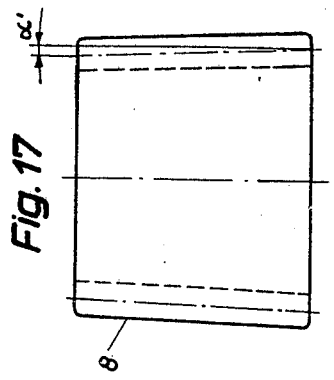

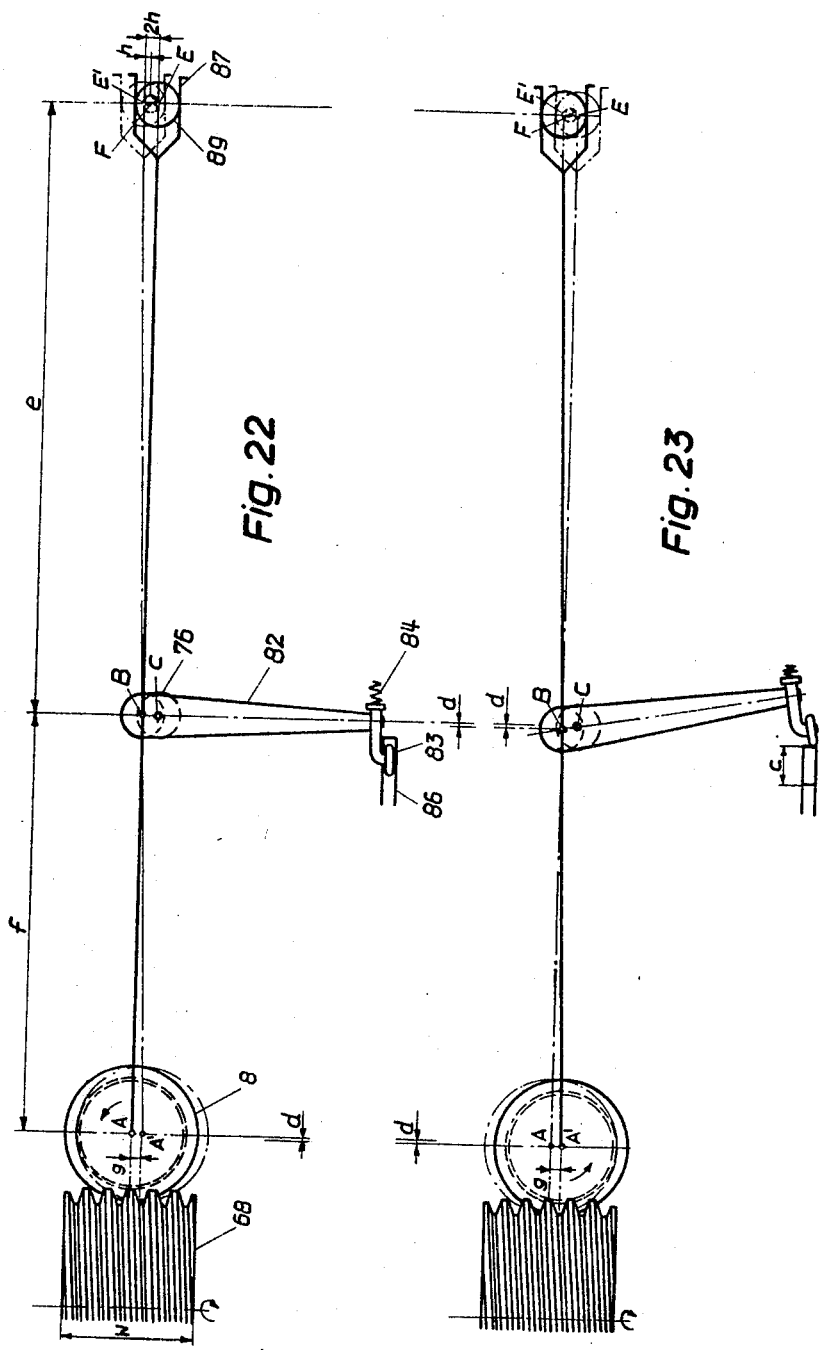

Jan. 6, 1970   A. RICKENMANN   3,487,585
HOBBING TYPE GEAR GRINDER

Filed Feb. 1, 1966

3,487,585
HOBBING TYPE GEAR GRINDER
Alfred Rickenmann, Zurich, Switzerland, assignor to
Reishauer A.G., Zurich, Switzerland
Filed Feb. 1, 1966, Ser. No. 524,030
Claims priority, application Germany, Feb. 4, 1965,
R 39,813
Int. Cl. B24b 3/12, 5/00, 9/00
U.S. Cl. 51—95                                                      4 Claims

ABSTRACT OF THE DISCLOSURE

In a hobbing type gear grinder of the kind having relatively movable mounting means for a hob and a workpiece which are rotatable about separate axes, and co-acting templet and sensing means, one of said mounting means is provided with reaction means for translation of the pattern of movement produced by said templet and sensing means into another relative movement between the mounting means for determining the longitudinal profile of the teeth produced on the workpiece.

---

This invention is for improvements in or relating to hobbing type gear grinding machines in which a workpiece being machined is in the contact with a grinding hob while being ground. In conventional cutting the hob has the form of a worm.

There are two different forms of driving mechanism for gear grinding machines of the kind specified. First, there are machines in which the hob and the workpiece are driven by a common power source. Second, there are machines in which the drive is provided by two synchronous motors, one for the workpiece and the other for the hob. The invention is of use with both kinds of machines. The two-motor kind has been selected for explaining and describing the underlying idea of the invention.

The invention relates to attachments for hobbing type gear grinding machines, which attachments enable the machines to grind crowned and longitudinally conical teeth as well as gears having straight flanks.

Gears are produced with crowned teeth to obviate edge contact between teeth, so that the effects of minor axial errors can be minimised and the gears run quietly. Gears having longitudinally conical teeth are not bevel gears as conventionally understood but gears having a slightly conical face such as are used, for instance, in textile and printing machinery to compensate for center-distance differences.

Prior attachments are known in connection with the grinding of gears having crowned teeth. A grinding carriage bearing the grinding hob is mounted on the machine frame for horizontal displacement, and a saddle for a workpiece carriage is disposed opposite the grinding carriage. The same performs the infeeding movements necessary in grinding. The rotational axis of the grinding hob extends horizontally.

A drum is pivotally mounted in the saddle and the axis of drum rotation intersects the grinding spindle axis at right-angles. The workpiece carriage bears the workpiece which is to be ground, and which is clamped between two centers at either end to define an axis of rotation. To ensure that the hob correctly forms teeth of the desired type on the workpiece to be ground, the drum can be pivoted into an angular position corresponding to the helix angle of the hob and to the tooth helix angle of the workpiece. The whole workpiece section which is mounted on the machine frame, i.e., the saddle including the drum, workpiece carriage and workpiece, can be tilted towards the hob around an axis parallel to the grinding spindle axis. The purpose of this tilting movement is to vary the center-distance between the workpiece and the hob.

Variations in center-distance which can be produced by tilting the workpiece section are used in present-day hobbing type gear grinding machine to grind gears having crowned teeth. Two different methods of producing and controlling the tilting movement are known. In the first method, a feeler or sensor which slides over a templet has imparted to it a rotation which is transmittted via linkage to the saddle as a tilting movement. In the other method, hydraulic means are used; a templet-controlled piston acts on a hydraulic copy system for producing the tilting movement of the saddle.

In a variant of the first mentioned method the tilting movement is produced by a cam arrangement having the cam rotatably reciprocated by a gear and rack arrangement in which the rack is secured to the saddle.

The attachments described above have proved completely satisfactory in gear grinding machines designed to deal with small to medium size workpieces. However, in the case of gear grinding machines which have to deal with relatively large-diameter workpieces the weight of the workpiece is considerable and the construction of the machine must be adapted. Since the workpiece and the machine are so heavy, therefore, it may be difficult to produce and control accurately a tilting movement which for crown grinding amounts, as a rule, only to a few microns. The above mentioned variant has the additional disadvantage that there is a play in the gear combinations at each reversal of the cam rotation.

In another known crown grinding attachment, a templet secured to the workpiece carriage of the machine is connected by mechanical transmission means to a grinding spindle running in two eccentric bearing bushes or sleeves or the like. The transmission elements concerned comprise a number of items including a telescopic shaft and ball joints. With this attachment, the position of the grinding spindle can be altered, in conditions to be determined beforehand, to vary the center-distance between the hob and the workpiece. To this end, the templet imparts a small rotation to the eccentric bearing sleeves. However, disadvantage of this construction is that the large number of transmission elements make it difficult to maintain reliable control over the very small displacements of the grinding spindle position. If the gears are to be ground to present-day standards of accuracy, the transmission means must be of high-precision manufacture and require very careful assembly, with consequent high costs.

Any system for obviating the disadvantages of these known crown grinding attachments must enable gears to be ground with crowned and longitudinally conical teeth by simple means, irrespective of workpiece weight and to very high precision standards.

The system of the invention to be described hereinafter is a novel solution of the problem and which enables gears to be crown ground and conically ground by simple means. The simple construction of the invention ensures reliability of operation and economy.

According to the invention, the saddle bearing the workpiece carriage and all the workpiece drive elements is displaceably mounted on the machine bed. The saddle is displaced by a simply constructed device, or reaction means, controlled by a templet secured to the workpiece carriage. Changes in the position of the workpiece axis which can be controlled under predeterminable conditions can then be effected. The resulting center-distance variations between the workpiece and the grinding hob meet all the requirements for crown grinding and conical grinding.

The system according to the invention is also of use for the reciprocating grinding of gears. In reciprocating grinding the rotational axis of the workpiece reciprocates continuously during grinding in a direction parallel to the vertical plane passing through the rotational axis of the grinding hob. This reciprocating movement is horizontal and extends over a very reduced distance. In reciprocating grinding the lines of contact of the hob and the workpiece experience displacements, with a consequent improvement in the surface texture of the ground tooth flanks.

For reciprocating grinding the crown grinding and conical grinding attachment according to the invention is also driven by a separate power source, the arrangement being such that the attachments can be used just for crown grinding and conical grinding or for reciprocating grinding alone or in combination or simultaneously.

For a better understanding of the invention and to show how the same may be carried into effect, reference may now be made to the accompanying drawings wherein:

FIGURE 5 is a diagrammatic view of the crowning attachment in the central position of the workpiece;

FIGURE 6 is a view of the central position of the workpiece;

Figure 25:
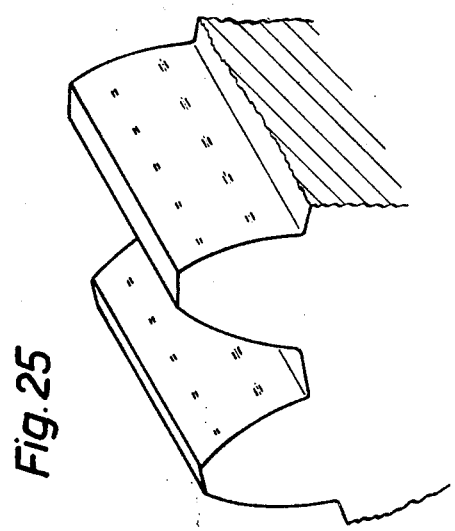
Figure 24:
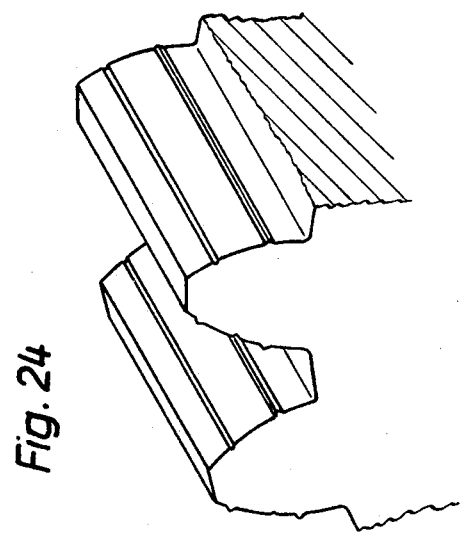

FIGURE 7 diagrammatically shows the crowning attachment in the operative end positions of the workpiece;

FIGURE 8 shows the top operative end position of the workpiece;

FIGURE 9 shows the bottom operative end position of the workpiece;

FIGURES 10–21 are diagrams showing the relationship between the templet (FIGURES 10–13) used during the grinding of a gear and the tooth shape to be expected from the workpiece (FIGURES 14–17) or the workpiece tooth direction diagram (FIGURES 18–21);

FIGURE 22 is a diagrammatic view similar to FIGURE 5 but with an extra attachment for reciprocating grinding;

FIGURE 23 is a diagrammatic view similar to FIGURE 7 but with an extra attachment for reciprocating grinding; and, FIGURES 24 and 25 show the qualities of tooth flank which can be provided by different operating conditions.

CONSTRUCTION OF MACHINE

A saddle 2 is displaceable on the bed 1. Through the agency of a guide rail 4, a workpiece carriage 3 is guided on the saddle 2 for vertical displacement and can be moved vertically by hydraulic means during grinding. The movement can be produced, for instance, by a piston 5 moving in a cylinder in the saddle 2. Two chambers 6, 7 of the cylinder can be pressurised alternately under the control of elements (not shown), according as the carriage 3 is required to move up or down.

A synchronous motor 9, hereinafter called the "workpiece motor" and flanged on to the saddle 2, drives the workpiece 8. A rotatably mounted cage 10 of a differential is centered in a bore in the saddle 2, the latter bore being coaxial of the axis of the motor 9. The cage 10 is locked for grinding straight-toothed gears. A pinion 11 is disposed on the shaft end of the motor 9 and meshes with a spur gear 12. The same is disposed together with another spur gear 13 on a shaft 14 rotatably mounted in the cage 10. The rotation is transmitted from the pinion 13 to a pinion 15 and via a shaft 16 and change gears 17–20 to a pinion 21 rigidly connected to a rotatable shaft 22. A spur gear 23 in engagement with the pinion 21 is disposed on a shaft 24 rotatably mounted in the carriage 3 and also meshes with a spur gear 25 rigidly connected to a work spindle 26. Through the agency of a dog 27, the rotations of the work spindle 26 are transmitted to a mandrel 28 and a workpiece 8 secured thereto. The mandrel 28 is centered between the centers of the work spindle 26 and the quill of a tailstock 29 which can be vertically adjusted, for instance, by operation of a handwheel 30.

As already mentioned, the differential cage 10 is maintained stationary for grinding straight-toothed workpieces. To this end, a disc 33 is placed at one end of a shaft 34 rotatably mounted in the saddle 2; the disc 33 has a locating pin 35 engaging in a registering bore in the saddle 2. A gearwheel 32 rigidly secured to the other end of the shaft 34 meshes with a toothed ring 31 of the cage 10. Consequently, neither the shaft 34 nor the two gearwheels 31, 32 in engagement therewith can rotate—i.e., the differential cage 10 is in a locked condition.

For grinding helical gears an extra rotation must be imparted to the workpiece and such rotation is provided by use of the differential, that is, by rotation of the cage 10. To this end, the locking disc or plate 33 is removed and replaced by a spur gear 36 which co-operates with three other spur gears 37–39 to form a chain-gear set devised to suit the requirements of the tooth angle to be formed on the workpiece 8. The spur gear 39 is rigidly secured to a rotatably mounted shaft 41 together with a spur gear 42, the latter meshing with a spur gear 43 disposed on a shaft 44 together with a bevel gear 45 meshing with a bevel gear 46 disposed on a shaft 47 rotatably guided in the saddle 2. A pinion 48 is secured to the left-hand end of the shaft 47 and meshes with a toothed rack 49 screwed fast to the workpiece carriage 3.

As already stated, the piston 5 is adapted to move the carriage 3, the rate of feed being determined for instance, by the quantity of oil entering or leaving the cylinder chamber 6, or 7, per unit of time. This quantity of oil can be varied and adapted to suit operating requirements.

A grinding carriage 52 is mounted on two horizontal guideways 53, 54 of the bed 1 and can be moved by operation of a screw-threaded spindle 56 which is in turn operated by a handwheel 55 and which meshes with a nut 57. A drum 58 is rotatably mounted in the grinding carriage 52 and has a toothed quadrant 59 meshing with a pinion 60 disposed together with a handwheel 61 on a shaft 62 rotatably mounted in the carriage 52. The drum 58 can be pivoted into an angular position by rotation of the handwheel 61. Such position depends upon the helix angle of a grinding hob 68; and, when helical gears are being ground, upon the tooth helix angle of the workpiece. The drum 58 can be pivoted to either hand so that helically toothed workpieces of either hand can be ground.

A tangential slide 63 is disposed on that side of the drum 58 which is near the workpiece 8. The slide or carriage 63 is displaceable on two guideways 64, 65 and has mounted on it a grinding spindle 66 and a synchronous motor 67 which is adapted to drive the spindle 66 and which will hereinafter be called the "grinding motor." A grinding hob 68 of width W is disposed at the other end of the spindle 66. The width W is greater than the contact area which occurs between the workpiece 8 and the hob profile when a gear is being ground. Shifting the slide 63 enables new unused portions of the hob 68 to be used for grinding until the whole available width W has been dulled and the hob has to be retrued by means which are not shown. To shift the slide 63, a handwheel 70 is disposed at one end of a shaft 69 rotatably mounted in the drum 58, and a pinion 71 is disposed at the other end of the shaft 69. The pinion 71 meshes with a toothed rack 72 secured to the slide 63. Consequently, rotation of the handwheel 70 moves the slide 63. After it has been moved it is locked by means of a lever 74 on the drum 58, the lever 74 being engaged in an aperture 73.

Two adjustable abutments 95, 96 are received in a groove 85 in the workpiece carriage 3 and co-operate with a switch 97 and with other electronic and hydraulic control means (not shown) to reverse the carriage 3, the pressure in the chambers 6 and 7 changing over at each such reversal.

As already stated, the saddle 2 is displaceably mounted on the bed 1. The means for shifting the saddle 2 are as follows: a shaft 76 is rotatably mounted at its top end in a bore and at its bottom end, with the interposition of a taper roller bearing 77, in the saddle 2. At its bottom end the shaft 76 has a pin or peg or the like which is eccentric by an amount $b$ and which is centered in the bed 1 by means of a taper roller bearing 79. A lever 82 is rigidly secured to the shaft 76 and extends outwards through an aperture in the saddle 2. A roller 83 is disposed on the lever 82. A groove 85 in the carriage 3 is adapted to receive a templet such as crowning templet 86. The position thereof is so chosen that the templet 86 is adjacent the roller 83 during the vertical movements of the carriage 3. A spring 84 biases the roller 83 continuously against the templet 86. Spring washers 80 are disposed between the bearing 79 and the base of the hole receiving the same to help take up backlash in the bearings 77, 79.

A taper roller bearing 90 is mounted by means of a shaft 89 in the bed 1 on the right-hand side of the machine. Disposed on the shaft 89 is a gearwheel 91 in engagement with a pinion 92 rigidly secured to the end of the shaft of a driving motor 93. At its top end the shaft 89 is formed with a bore which is eccentric by an amount $h$ of the axis of rotation of the shaft 89. A taper roller bearing 94 is received in the latter bore and centers a straight-line guide 87 which has a pin or peg or the like. Spring washers 88 act via the bearing 90, shaft 89 and bearing 94 to force the guide 87 into the guideway in the saddle 2, thus helping to take up backlash in the bearings 90, 94. Also, the springiness provided by the spring washers 80, 88 reduces the pressure with which the saddle 2 bears against the bed 1 and thus makes it easier to shift the saddle 2. When stationary the motor 93 is locked by a brake (not shown) so that the pinion 92 cannot be rotated. Consequently, the shaft 89 and therefore the guide 87 cannot change their positions relative to the saddle 2. The same can therefore move only in the direction determined by the position of the guide 87. This direction coincides with the extension of the straight line joining the axis of the workpiece 8 to the axis of the shaft 76 (see FIGURE 5)—i.e., the center of the shaft 76 forms the axis of rotation for the saddle 2.

GRINDING PROCEDURE

Consideration will now be given to the conditions likely to arise when the machine hereinbefore described is in operation.

For the purposes of the invention, it is immaterial whether one-way or two-way grinding is used. In one-way grinding material is ground off the workpiece 8 during only one direction of workpiece carriage movement for instance during the rising movement of the workpiece carriage 3. In two-way grinding, grinding is performed during the rising and descending movements of the carriage 3. With two-way grinding, an infeeding movement is made at the start of each stroke, by operation of the handwheel 55 or possibly in some other way, for instance, automatically. No consideration will be given in the present context to the infeeding movements. The machine of the invention is of use for grinding straight-toothed and helical gears. To simplify matters, the explanations given hereinafter are based on the conditions associated with grinding a straight-toothed spur gear.

Figure 1:
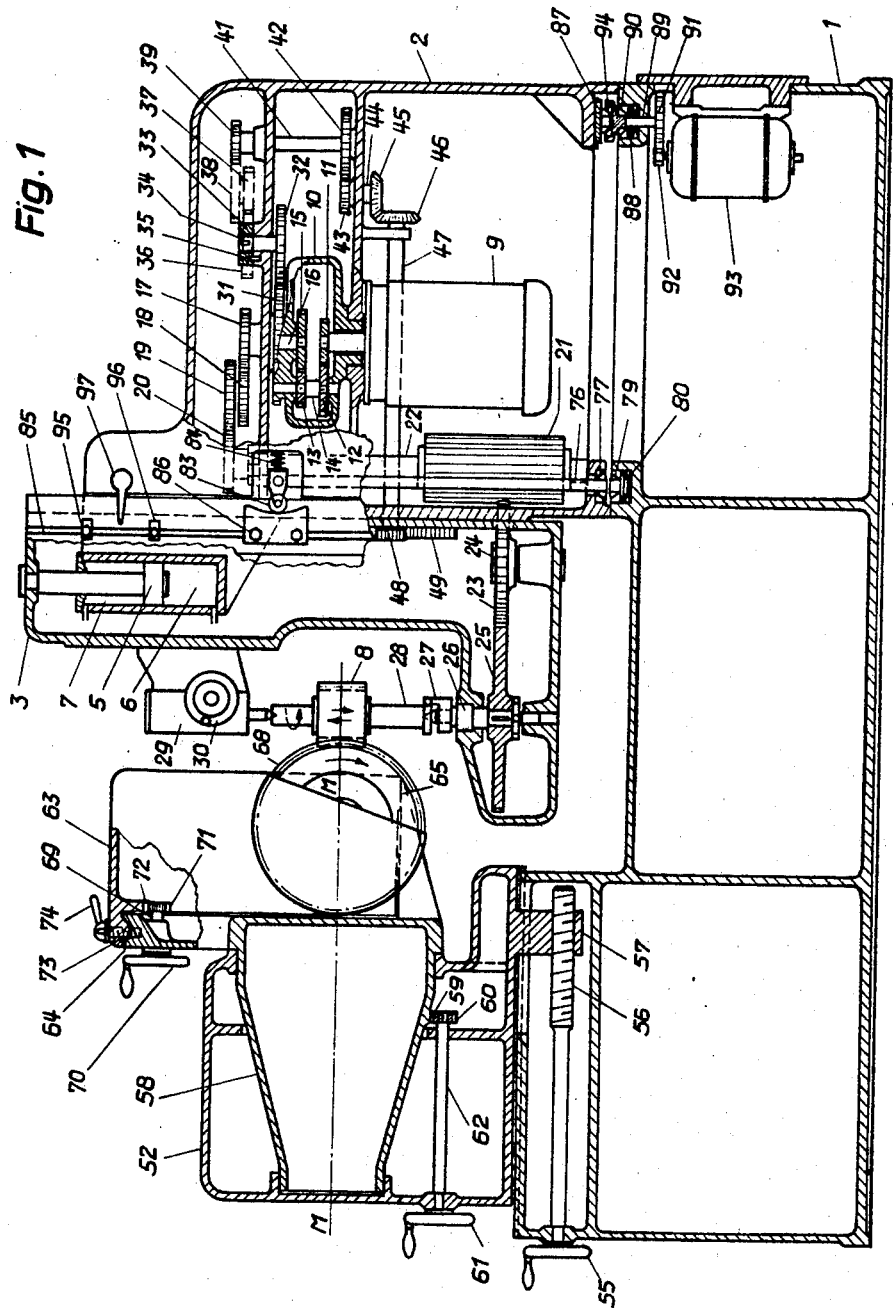
FIGURE 1 is a longitudinal section through a gear grinder according to the invention.
Figure 2:
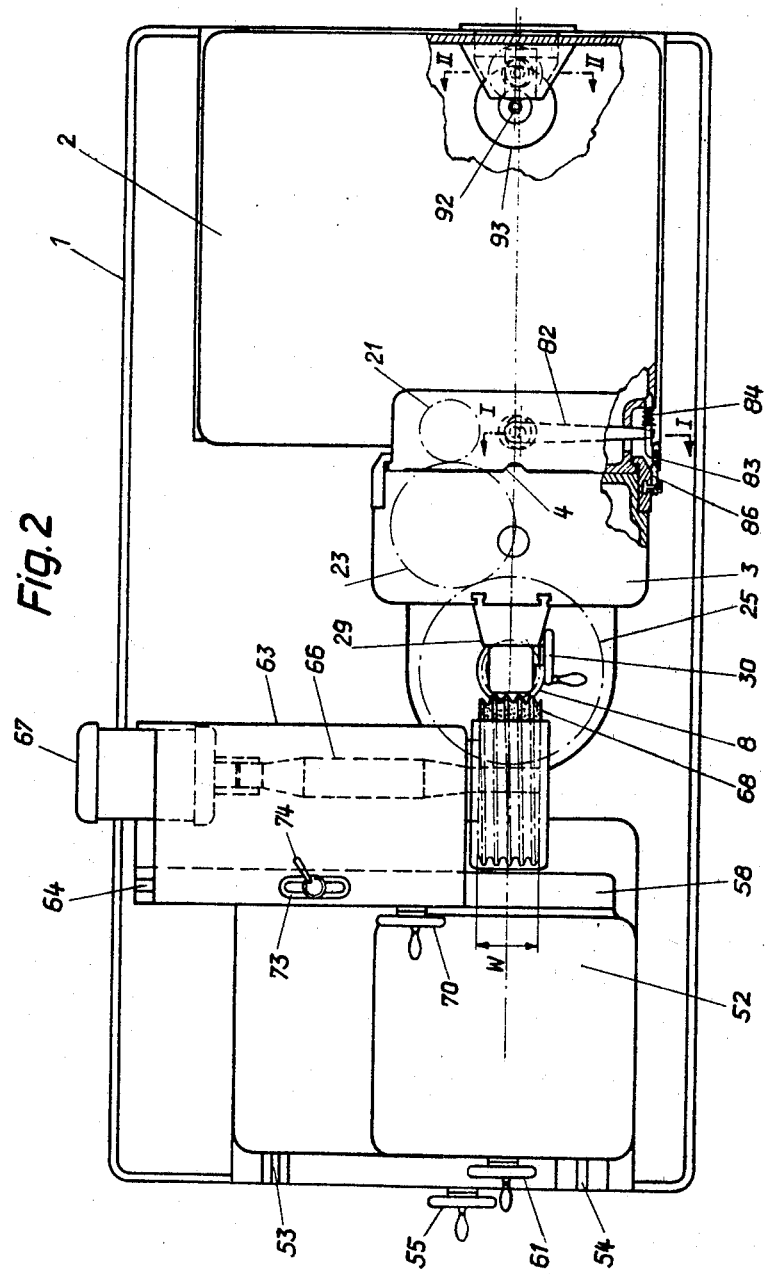
FIGURE 2 is a partly sectional plan view corresponding to FIGURE 1.

Referring to FIGURE 1, during grinding the right-handed grinding hob 68 is driven by the grinding motor 67 in the direction indicated by an arrow in FIGURE 1. The workpiece motor 9 drives the workpiece 8 via the gears 11–13, 15, 17–20, the pinion 21, the two gears 23, 25 and the dog 27. To ensure correct contact between the hob 68 and the workpiece 8, the drum 58 and therefore the axis of the grinding spindle 66 is tilted into an angular position corresponding to the helix angle of the hob 68. The same grinds material off the workpiece 8 as the workpiece carriage 3 rises and descends. When the workpiece carriage 3 reaches its top or bottom end position, the respective stop 96 or 95 operates the switch 97. Pressure conditions in the chambers 6, 7 therefore reverse and so, therefore, does the direction of movement of the workpiece carriage 3. The stops 95, 96 are so positioned that in the top (or bottom) end position the bottom (or top) end face of the workpiece 8 is at least as high or higher (or, respectively, at least as low or lower) as the horizontal axis M—M which extends along the axis of rotation of the drum 58 and passes through the center of the hob 68. The stroke or operative movement of the workpiece carriage 3 is therefore chosen to be at least as great as—and, as a rule, greater than—the width of the workpiece 8 to be machined.

(a) *The grinding of gears whose face is cylindrical and whose flanks are straight in the tooth direction*

Figure 3:
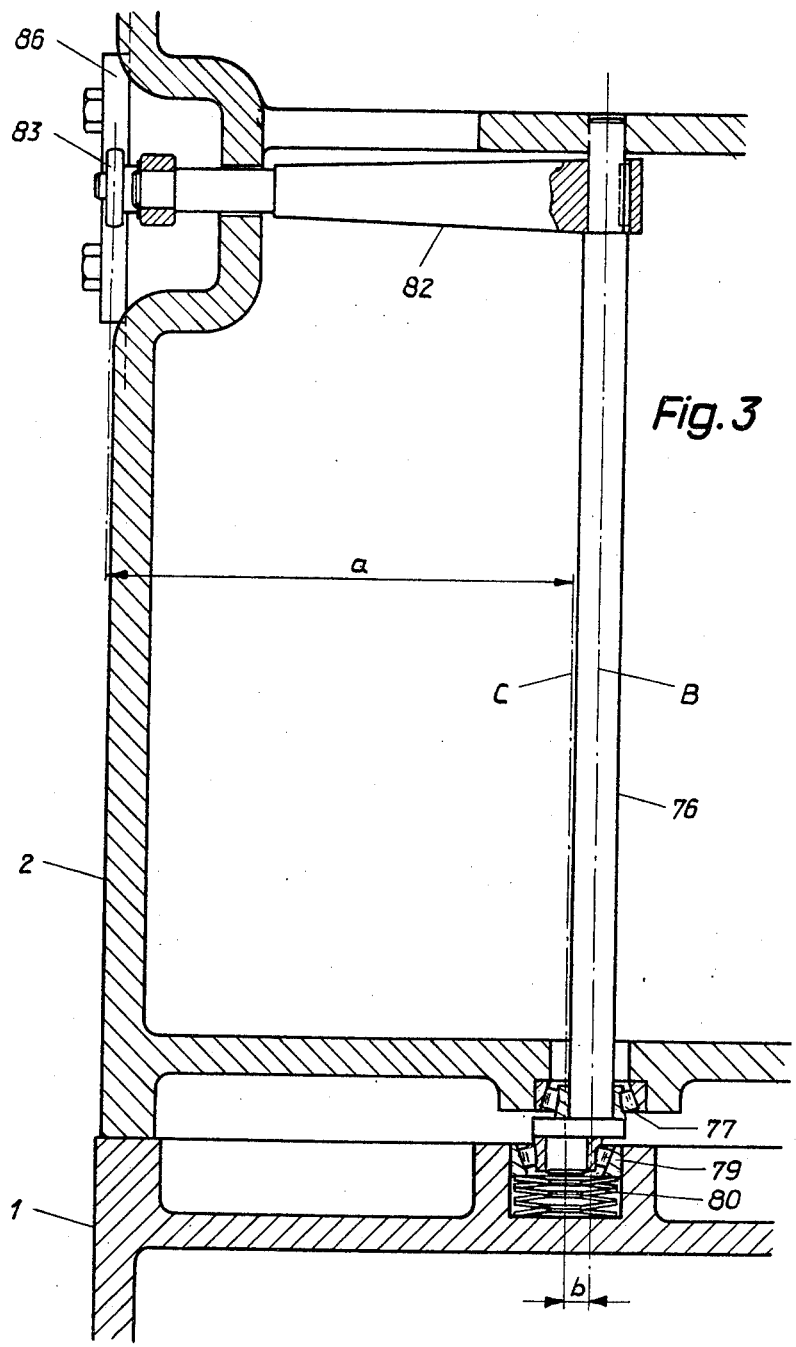
FIGURE 3 is a section on the line I—I of FIGURE 2.

The tooth direction, which can be measured on the ground workpiece by use of appropriate instruments, will be assumed to give a tooth direction diagram of the kind shown in FIGURE 18. The roller 83 and the lever 82 rigidly connected thereto stay in their normal position throughout the whole machining process (see FIGURE 10). Consequently, the shaft 76, with its pin (FIGURE 3) eccentric by the amount $b$, is not rotated, with the result that the position of the saddle 2 relatively to the bed 1 stays stationary during grinding. The eccentricity $b$ of the shaft 76 and the weight component of all the machine parts on the workpiece side are so designed and so adapted to one another that the eccentric retains its self-locking action despite the grinding pressure which is produced during grinding between the hob 68 and the workpiece 8. Under these operating conditions, and provided that the position of the grinding carriage 52 is not changed by external action, for instance, by rotation of the handwheel 55, during the rise and descent of the workpiece carriage 3, teeth (see FIGURE 14) which result in straight characteristics on the tooth direction diagram are produced on the workpiece 8.

(b) *Grinding gears whose face is cylindrical and whose flanks are crowned*

A gear with a crowned flank is required to have, for instance, a tooth direction diagram such as is shown in FIGURE 19. To enable such a gear to be ground, a templet 86 is required which is secured in the groove 85 in the workpiece carriage 3. The position of the templet 86 is so chosen that the roller 83 contacts the lowest place D when the workpiece 8 is in the central position relatively to the horizontal axis M—M of the hob 68 (FIGURES 11 and 6). The lever 82 then has, as shown in FIGURE 5, its longitudinal axis perpendicular to the straight line joining the rotational axis A of the workpiece to the eccentric axis E of the straight line guide 87. The axis B of the bore in the lever 82, the latter axis coinciding with the vertical axis of the shaft 76, lies on the straight line AE. When the workpiece slide 3 rises or descends from its central position together with the templet 86, the roller 83 of the lever 82, which is biased by the spring 84, follows the templet 86, the lever 82 pivoting anticlockwise. The resultant pivoting movement occurs around the axis C. Consequently, the axis B—i.e., the shaft 76—is displaced to the left—in other words, the saddle 2 connected to the shaft 76, and the workpiece 8, are shifted radially towards the grinding hob 68.

When the workpiece carriage 3 with the workpiece 8 has risen so far that the rotational axis of the roller 83 coincides with the plane passing through the bottom end face G' of the workpiece 8, the roller 83 contacts the templet 86 at a place G. During the rise of the carriage 3, the roller 83 was displaced horizontally to the right by an amount $c$ (see FIGURES 11, 7 and 8). Associated with this shift $c$ is a shift of the shaft axis B to the left by an amount $d$. Correspondingly, the center distance between the hob 68 and the workpiece 8 has been reduced by the amount $d$.

The templet 86 shown in FIGURE 11 is symmetrical of the horizontal axis through D. When the workpiece 8 reaches the position shown in FIGURE 9 upon the descent of the carriage 3, the roller 83 has again been displaced by the amount $c$, so that the workpiece 8 has been displaced radially towards the hob 68 by the amount $d$.

Assuming that there is no change in the position of the grinding carriage 52 during the ascent and descent of the carriage 3 and that a templet 86 shaped as shown in FIGURE 11 is used, the center distance between the hob 68 and the workpiece 8 is at a minimum at the places G and F and at a maximum at the place D. More and more material is ground off the workpiece 8 from the center D' towards the ends F' and G', so that the teeth have a corresponding barrel or crowned shape (see FIGURE 15).

Consequently, provided that appropriate templets are used, the workpiece 8 can be given any desired crowning. In some gears, for instance, a tooth direction diagram of the kind shown in FIGURE 20 is required—i.e, only the tooth ends are required to be crowned. The purpose of this feature is to avoid producing edge contact teeth which make an excessive noise in use. Two templets 98, 99 are used to produce teeth having crowned ends. As can be gathered from FIGURE 12, the roller 8 is displaced by the two templets 98, 99 only between the places J and H and between K and L during the ascent and descent of the workpiece carriage 3, but stays stationary between the places J and K in just the same way as for grinding teeth with straight flanks. Changes in center distance between the hob 68 and the workpiece 8 are, as previously, associated with the displacements of the roller 83. Correspondingly, the teeth have straight flanks in the zone J' to K' and crowned flanks towards the ends H' and L' (see FIGURE 16).

(c) Grinding of gears having a conical face

The system hereinbefore described is also of use for grinding gears having a conical face and teeth which are conical lengthwise. Gears of this kind are not bevel gears in the general sense but spur gears having a slightly conical face and a continuous profile displacement (see FIGURES 17 and 21). The appropriate templet 100 is screwed to the workpiece slide 3 at an angle $\alpha$ to the direction of movement thereof, as shown in FIGURE 13. Operation is as just described in section (b) hereof. A cone angle $\alpha'$ is produced on the workpiece 8, corresponding to the templet control surface inclined at the angle $\alpha$. The angle $\alpha$—i.e., the cone angle $\alpha'$ of the workpiece 8—can be varied by pivoting the templet 100.

Templets which will not be described in any greater detail herein enable gears to be ground with a conical face and crowned teeth.

In the description given so far, the control or operative surface of the templet 100 has geometrically simple shapes, such as an arc or a straight line. If the templet 100 is appropriately shaped, in a manner not disclosed herein, the invention can be used to produce, on straight-toothed or helically-toothed spur gears having a cylindrical or slightly conical face, any longitudinally convex (crowned) or longitudinally concave tooth shapes and any combinations thereof.

(d) The reciprocating grinding of gears having a cylindrical or conical face

Reciprocating grinding is used only for finish-grinding a workpiece 8. To this end, the connection between the dog 27 and the mandrel 28 is released. The means and devices required for this purpose are described and shown, for instance, in German patent specification 841,986. In this case, the grinding hob 68 acts as a driver and drives the workpiece 8 secured to the mandrel 28. During reciprocating grinding, the workpiece is reciprocated as well as being rotated and moved vertically.

Figure 4:
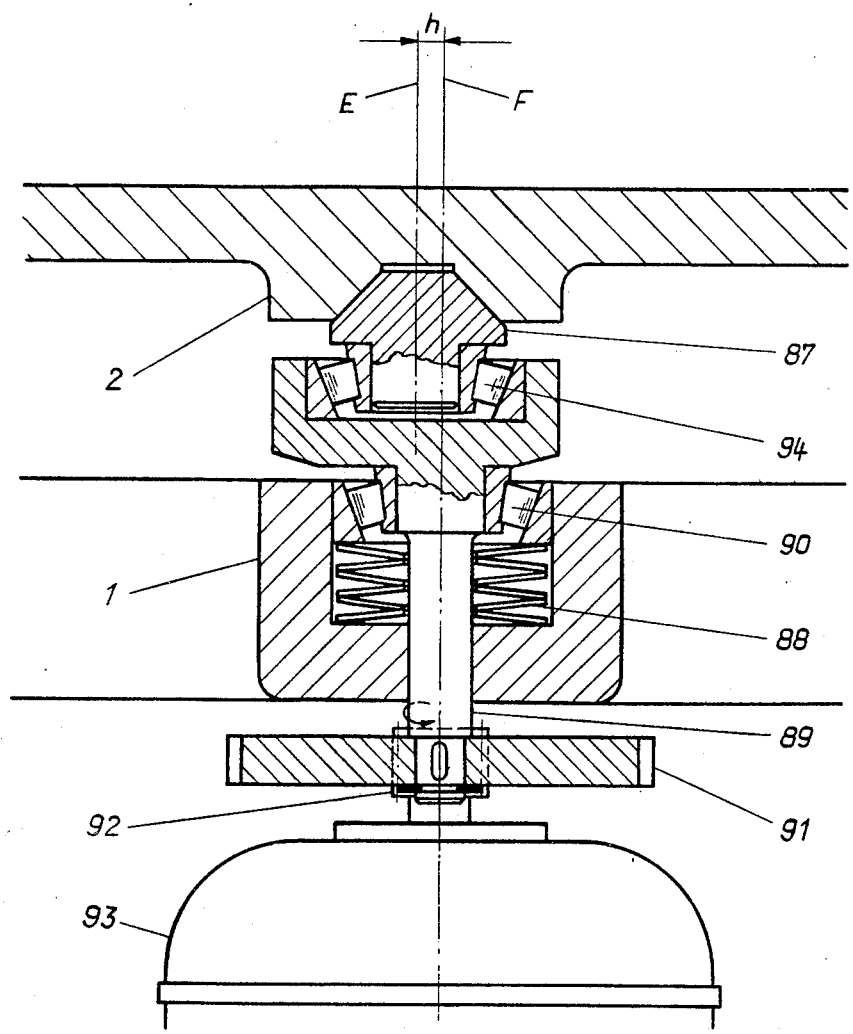
FIGURE 4 is a section on the line II—II of FIGURE 2.

The reciprocating motion of the saddle 2—i.e., of the workpiece 8—is initiated by starting the driving motor 93. The pinion 92 on the motor shaft drives the shaft 89 anticlockwise via the gear 91 (see FIGURE 4). The eccentric axis E rotates anticlockwise around the axis F of rotation of the shaft 89 (see FIGURE 22). Of this rotation, only the component which is perpendicular to the guide 87 is transmitted to the saddle 2. The shaft 76 with its axis B at a distance $e$ from the axis F of rotation of the shaft 89, is the center around which the saddle 2 reciprocates. When the eccentric axis E has moved to the position E' and covered the distance component $2h$ perpendicular to the guide 87 the straight line AE—i.e., the saddle 2—has pivoted anticlockwise around the axis B into the position A'E'. The continuously rotating workpiece 8, whose axis of rotation is at a distance $f$ from the center B of rotation, has correspondingly also been shifted by the amount $g$. The amount or distance $g$ extends, as a chord of the arc AA', parallel to the vertical plane through the axis of rotation of the hob 68. As the eccentric axis E continues to rotate around the rotational axis F of the shaft 89, the workpiece 8 reciprocates continuously.

If the fixed rotational axis B is retained, the invention can be used without the lever 82, roller 83 and templet 86 for the reciprocating grinding of conical-face spur gears. Also, as FIGURE 23, shows, the invention can be used in combination with crown grinding or conical grinding. In such cases, the rotational center B of the saddle 2 is reciprocated by an amount $d$ through the agency of the particular templet 86 used, reciprocating proceeding along the lines just outlined.

If the hob 68 and workpiece 8 are driven positively—i.e., if there is a rigid connection between, on the one hand, the work spindle 26 and mandrel 28 and, on the other hand, the workpieces 8, the same rotates around the axis A. It is always the same narrow strips of the hobs 68 which perform the grinding work on the workpiece 8. The position of such strips is determined by the contact relationships between the hob 68 and the workpiece 8. These strips wear but the other parts of the hob profile do not get any wear. If the strips have irregularities, such as broken-out parts or coarse projecting grains, the surface texture of the toothed flanks is impaired. In hob grinding, the same irregularities of the operative narrow strips always pass over the same places of the tooth flanks into contact with the workpiece 8 at each revolution of the hob 68. Since the workpiece 8 is moved up and down along its axis of rotation during grinding, the unevennesses caused by these irregularities on the tooth flanks build up cumulatively into continuous burrs or ridges extending parallel to the tooth addendum edge (see FIGURE 24).

In the case of reciprocating grinding, in which the workpiece 8 is reciprocated over a distance $g$, there is a continuous parallel displacement of the lines of action of the operative strips of the hob 68. During this displacement new adjacent strips of the hob 68 are continuously being used to machine the workpiece 8. Consequently, defects on the hob or on any single strip thereof affect tooth flank surface texture for only a fraction of the time as compared with the conditions just described. Continuous burrs or ridges on the tooth flanks are reduced very considerably, only discrete protuberances or scratches being left (see FIGURE 25). Reciprocating grinding therefore improves tooth flank surface texture and hence makes the gear run more quietly.

The invention is of course of use in gear grinding machines in which a vertical hob carriage performs the vertical reciprocation along the axis of workpiece rotation. In this case, the changes in position for crown grinding, conical grinding or reciprocating grinding are associated with the hob. The operation of the templet and the separate power supply are exactly the same, the templet acting via the vertical carriage and saddle, respectively, to produce the respective necessary center distance changes and tangential displacements between the workpiece and the hob. In this arrangement, the axially stationary workpiece would perform the infeeding movements required for grinding.

I claim:

1. A hobbing type gear grinder, comprising a machine bed, first mounting means on said machine bed for mounting a hob for rotation about an axis, second mounting means on said bed for mounting a workpiece for rotation about another axis, said first and second mounting means being mounted on said bed for relative movement therebetween, said second mounting means comprising a saddle movable on said machine bed, a workpiece carriage slidably mounted on said saddle and supporting the workpiece for rotation about said other axis, drive means for driving said workpiece carriage relative to said saddle, a templet, means on said workpiece carriage for securing said templet thereto, sensing means being located in said saddle for following the profile of the templet, when said workpiece carriage is driven, to produce a pattern of movement, and reaction means on said second mounting means for translating said pattern of movement into an additional relative movement between said first and second mounting means for determining the longitudinal profile of teeth produced on said workpiece.

2. A hobbing type gear grinder as claimed in claim 1, in which said reaction means is located in said saddle and is connected to said sensing means for imparting positional changes to said saddle relative to said bed in response to the motion of said sensing means to change the distance between the axes of rotation of the hob and the workpiece whereby to determine the longitudinal profile of teeth produced on the workpiece.

3. A hobbing type gear grinder as claimed in claim 2, in which said sensing means comprises a roller, and said reaction means includes a shaft rotatably mounted in said saddle and a pin mounting said shaft eccentrically in said machine bed, said shaft being acted upon by said roller in a sense to rotate said shaft.

4. A hobbing type gear grinder as claimed in claim 2, in which said reaction means comprises a shaft rotatably mounted in said saddle, a pin rigidly connected to said shaft eccentrically of the axis of said shaft, such pin being rotatably engaged in a bore in said machine bed, and a lever rigidly attached to said shaft to extend transversely of said shaft, and said sensing means comprises a roller mounted on said lever for sensing the profile of the templet.

References Cited

UNITED STATES PATENTS

| | | | |
|---|---|---|---|
| 2,597,648 | 5/1952 | Lucas | 51—100 |
| 2,786,309 | 3/1957 | Rickenmann. | |
| 2,839,875 | 6/1958 | Rickenmann. | |
| 2,898,707 | 8/1959 | Rickenmann. | |
| 3,071,897 | 1/1963 | Pickener. | |
| 3,251,157 | 5/1966 | Clark | 51—100 |

ROBERT C. RIORDON, Primary Examiner

DONALD G. KELLY, Assistant Examiner

U.S. Cl. X.R.

51—100